Aug. 21, 1928.
J. H. CLARK
DEFLATING INDICATOR
Filed July 5, 1927
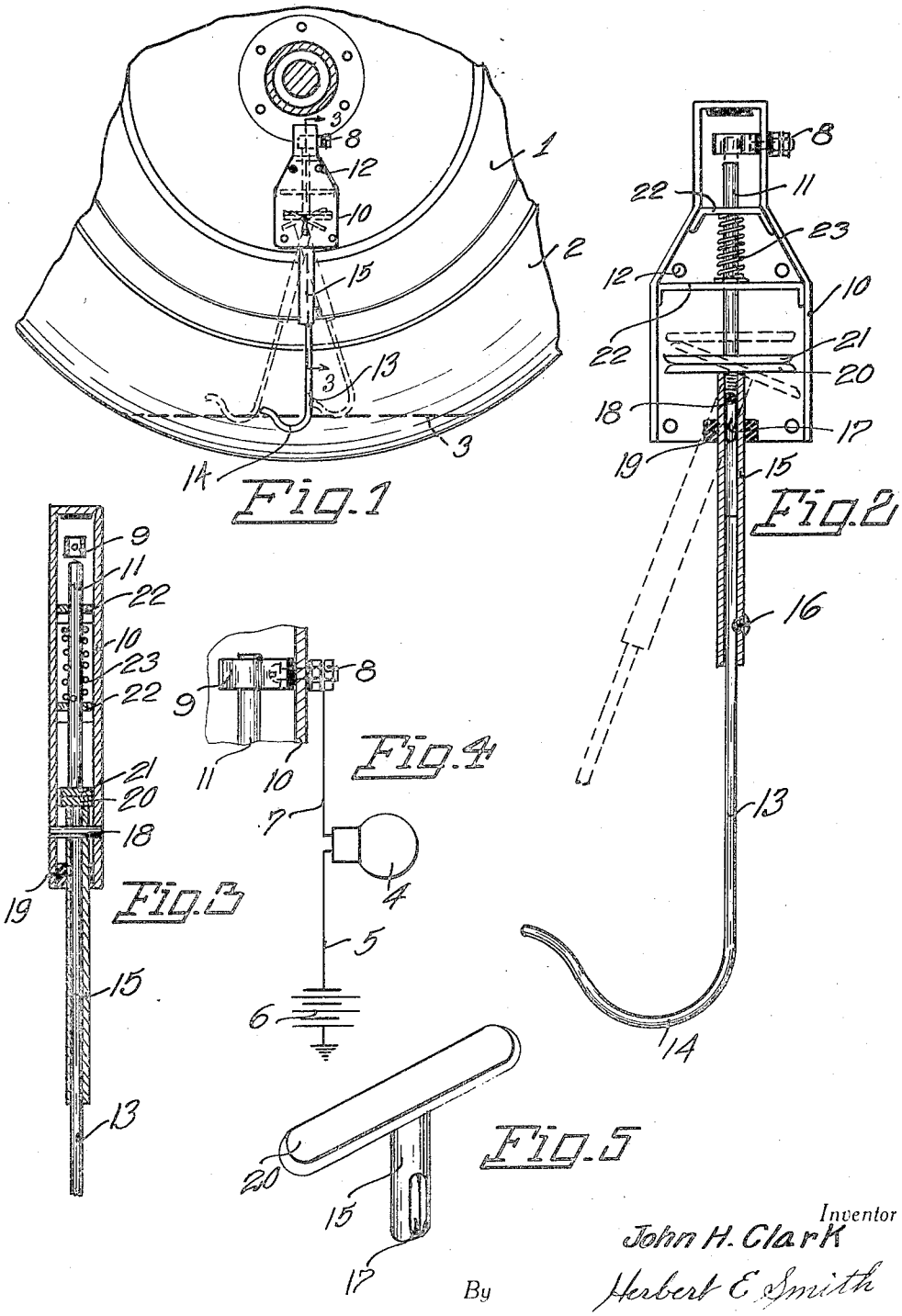
Inventor
John H. Clark
By Herbert E. Smith
Attorney Patented Aug. 21, 1928.

1,681,608

UNITED STATES PATENT OFFICE.

JOHN H. CLARK, OF SEATTLE, WASHINGTON.

DEFLATING INDICATOR.

Application filed July 5, 1927. Serial No. 203,476.

My present invention relates to an improved deflating indicator designed especially for use in connection with automotive vehicles for the purpose of indicating deflation of a pneumatic tire when such an emergency arises.

The indicator or warning signal in this instance is an electric lamp which may be conveniently carried on the dashboard or instrument board of the vehicle. The circuit for the lamp is normally open, and a circuit maker is provided which is closed by the movement of parts, which movement is initiated when the tire is deflated to a certain point.

Thus as the tire is deflated to the danger point, the circuit is made and the lamp is illuminated as a warning signal. The circuit maker and its actuating parts are carried on the housing of the vehicle, as at the inner side of a disk wheel, and in connection with the circuit maker I employ a normally inoperative tappet which is designed to contact with the ground when the tire is deflated.

The invention consists in certain novel combinations and arrangements of parts as will hereinafter be more fully described and claimed.

In the accompanying drawings, I have illustrated one complete example of the physical embodiment of my invention wherein the parts are combined and arranged according to the best mode I have so far devised for the practical application of the principles of my invention.

Figure 1 is a view in elevation showing so much of a pneumatic wheel as is necessary to indicate the application thereto of the device of my invention;

Fig. 2 is an enlarged detail sectional view of the actuating device for the circuit maker;

Fig. 3 is a sectional view at line 3—3 of Fig. 1;

Fig. 4 is a diagrammatic view showing the electric wiring for the lamp or signal; and Fig. 5 is a perspective view of one of the movable parts of the operating device of the circuit maker.

In order that the general arrangement and relation of parts may readily be understood, I have shown in Fig. 1 a portion of the inner side of a disk wheel 1 having the usual pneumatic tire 2, and the dotted line 3 of this figure indicates the degree of deflation of the tire at which the indicator becomes operative.

The signal in this instance is an electric lamp 4 which may be located in position where it may be readily seen by the driver of the car, and the lamp is provided with a wire 5 to the battery 6. The wire 7 from the lamp leads to a terminal 8 which is part of the circuit maker carried by the wheel. The circuit maker which is normally open, comprises a pair of stationary contact springs or arms 9 that are enclosed within a housing 10, and the bar 11 forms the movable contact member of the circuit maker. The bar as shown in Figs. 2 and 3, is normally detached from the spring arms, but to close the circuit the bar is projected in between the arms as indicated in Fig. 4, to make frictional contact as well as electrical contact with the spring arms and thus close the signal circuit and illuminate the lamp.

The housing 10 is secured near the hub of the disk wheel by fasteners as 12, and this housing which is open at its outer end supports an actuating tappet by means of which the circuit is closed. The actuating tappet includes a bar 13 having a hooked end 14 that contacts with the ground when the tire is deflated to the dotted line position of Fig. 1. This bar 13 is adjustable for use with various sized wheels, and is therefore carried in a tubular bar 15. The bar 13 telescopes in the tubular bar, and a set screw 16 in the tubular bar is used to secure the bar 13 or tappet in adjusted position within the tubular bar.

The tappet device is pivoted in the housing, and for this purpose is provided with a longitudinally extending slot 17 in the tubular bar 15. By means of the longitudinal slots the tappet is supported on the pivot pin 18 that extends transversely of the housing, and an anti-rattler or rubber block 19 encircles the tubular bar 15 to stabilize the movement of the tappet. The tappet is designed to swing on its pivot as indicated by dotted lines in Figs. 1 and 2, and the slots 17 of the tappet permit movement of the tappet relative to its pivot 18 as indicated.

At the upper end of the tubular bar 15 is provided a cross head 20, and this cross head coacts with a complementary cross head 21 on the lower end of the slide bar 11 that forms the movable contact member of the circuit maker. The slide bar 11 is supported in spaced perforated partitions 22 inside the housing, and a spring 23 which is coiled about the bar 11 is interposed between the spaced partitions 22. The spring normally holds the head 21 in contact with the head 20, and in this position the end of the bar 11 is normally held out of contact from the spring arms 9.

When the hook 14 strikes the ground, it will be apparent that it is pushed upwardly within the housing, and the movement of the wheel causes the tappet to swing as indicated by dotted lines in Fig. 1. The contact of the tappet head 20 with the cross head 21 of the circuit making member 11 causes the bar 11 to be shoved toward the spring arms 9, against the tension of the spring 23. Frictional engagement of the bar 11 with the spring arms 9 closes the circuit and illuminates the lamp 4. The lamp may be thus constantly illuminated, or intermittently illuminated as the wheel turns and the hook 14 contacts with the ground, thus giving a warning signal to the driver of the car as to the deflated condition of the tire.

Having thus fully described my invention, what I claim as new and desire to secure by Letters Patent is—

1. The combination with a housing and a circuit closer therein comprising a movable member, of a tappet pivotally supported in the housing, a tappet head on said tappet, and a complementary head on the movable member of the circuit closer, whereby when the tappet member strikes the ground the circuit is closed for the purpose described.

2. The combination with a housing and a spring pressed member, of a circuit maker, and a head on said member, of a tubular bar having a tappet head thereon and pivoted in the housing, a tappet bar secured in said tubular member, and a hooked end on said tappet member.

In testimony whereof I affix my signature.

JOHN H. CLARK.